United States Patent
Menzl

(10) Patent No.: US 7,437,578 B2
(45) Date of Patent: Oct. 14, 2008

(54) ADVANCED SLEEP TIMER

(75) Inventor: Thomas Menzl, Villingen (DE)

(73) Assignee: Harman Becker Automotive Systems, GmbH, Karlsbad (DE)

(*) Notice: Subject to any disclaimer, the term of this patent is extended or adjusted under 35 U.S.C. 154(b) by 483 days.

(21) Appl. No.: 11/180,974

(22) Filed: Jul. 13, 2005

(65) Prior Publication Data

US 2006/0053315 A1 Mar. 9, 2006

(30) Foreign Application Priority Data

Jul. 13, 2004 (EP) .................. 04016481

(51) Int. Cl.
*G06F 1/00* (2006.01)
*G06F 1/26* (2006.01)
(52) U.S. Cl. .................... 713/300; 713/320
(58) Field of Classification Search .............. 713/300
See application file for complete search history.

(56) References Cited

U.S. PATENT DOCUMENTS

| 5,627,882 | A |   | 5/1997 | Chien et al. |
| 5,905,901 | A | * | 5/1999 | Klein ............... 713/324 |
| 5,913,067 | A |   | 6/1999 | Klein |
| 6,457,134 | B1 |  | 9/2002 | Lemke et al. |
| 6,516,421 | B1 |  | 2/2003 | Peters |

FOREIGN PATENT DOCUMENTS

| EP | 0 751 512 A2 | 6/1996 |
| EP | 0 751 512 A3 | 6/1996 |

* cited by examiner

*Primary Examiner*—Rehana Perveen
*Assistant Examiner*—Stefan Stoynov
(74) *Attorney, Agent, or Firm*—Brinks Hofer Gilson & Lione

(57) ABSTRACT

A sleep timer for changing a power state of a device includes a detector, a memory, a sleep interval setting unit, a timer, and a power unit. The detector detects interactions between a user and an active device. The memory is linked to the detector and stores the historical user interaction data. Based on the historical user interaction data, the sleep interval setting unit adjusts the sleep timer's sleep interval. The timer determines a power changing point in time based on the sleep interval. At the power state changing point in time, the power unit initiates a power state change.

45 Claims, 9 Drawing Sheets

ADVANCED SLEEP TIMER

PRIORITY CLAIM

This application claims the benefit of priority from European Patent Application No. 04016481.6, filed Jul. 13, 2004, which is incorporated herein by reference.

BACKGROUND OF THE INVENTION

1. Technical Field

This invention relates to a sleep timer for controlling the power state of a device, and more particularly to a module for automatically changing the power state of a variety of devices at a predetermined point in time.

2. Related Art

Audio/visual recording devices may be equipped with a sleep timer. A sleep timer may be a module that is used to power off a device or to set a device into a standby mode at a predetermined point in time. The point in time is set such that a user has most likely finished using the device, such as when the user has fallen asleep. In this way, power consumption can be reduced, saving battery capacity.

Some sleep timers are manually activated by the user by selecting a time interval from a predefined range of values. After the selected time interval expires, the sleep timer will automatically switch off the device.

Other sleep timers may not require a manual activation. These sleep timers always switch off the device after a fixed time interval has elapsed without any user interaction.

Alternatively, a sleep timer may combine a manual or non-manual sleep timer with a so-called auto-mode sleep timer. The auto-mode sleep timer can automatically switch off a device when power is no longer needed, even though a predetermined time interval has not yet elapsed.

While these sleep timers use different ways to switch off the device, their operation does not reflect the individual situation of a user. Even when a user can select the sleep time interval, the user must know in advance the desired time interval before falling asleep. Accordingly, these sleep timers may switch off a device either too early or too late Therefore, a need exists for a sleep timer for controlling the power state of a device that takes into account the characteristics of a user's individual behaviour.

SUMMARY

A sleep timer evaluates a user's interaction with a controlled device. Based on an analysis of the user's interaction, the sleep timer determines a sleep interval indicating a remaining time interval until a controlled device's power state is changed. When no user interaction occurs for a period of time, the sleep timer automatically changes the controlled device's power state.

Alternatively, a sleep timer may include one of or a combination of, an evaluation unit, an input, a timer mode selection unit, or a display. The evaluation unit calculates user interaction data which may be used when setting the sleep interval. An input allows a user to input sleep timer parameters that may be used in setting the sleep interval or in the operation of the sleep timer. The timer mode selection unit determines the periods when the power changing portion of the sleep timer is enabled or disabled. The display provides visual information to a user.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A sleep timer may consider a user's profile of interaction with a controlled device when determining a power state changing time. User interactions may be monitored to create the user's profile of interaction. User interactions may include pressing a key on the controlled device, a remote control, or on another device. Many or all interactions of the user with the controlled device may be considered to represent a kind of keep alive message.

By performing statistical evaluations based on user interaction data, a sleep timer may determine a user's behavioural characteristics. Some user behavioural characteristics may include the minimal, the average, and/or the maximum time interval between two subsequent user interactions. The sleep interval, the time elapsed before a power state change is initiated, may be determined based on at least one of these calculated values. A power state change may include transitioning a controlled device from an active state to a standby mode or completely powering off the controlled device. A sleep timer may monitor every user interaction and conduct statistical evaluations upon detection of each new interaction, thereby ensuring that the sleep interval is always adapted to the current usage.

A user may select between several sleep timer strategies. Some strategies may include setting the sleep interval to a maximum value or an average value of the interval between two subsequent user interactions. Alternatively, a sleep timer strategy may include one of the statistical calculations plus one or more offset times. Such individual settings may take into account that different users may have a different behaviour or different preferences, even if the result of the statistical evaluations of their interaction history with the controlled device is the same.

The operation of the sleep timer may be set to different modes to be used during different periods of the day. The start points and end points of such periods may be defined by a user. The user may predefine the switching times between the predefined periods of the day, define an individual sleep timer strategy for each defined period of the day, and/or enable or disable the automatic power state changing function for each defined period of the day.

Because the sleep timer is monitoring each user interaction and performs statistical evaluations after each user interaction, the sleep interval is always adapted to the current usage. Additionally, providing a user with the option to choose between several sleep timer strategies and to set an individual offset enables the sleep timer to be easily configured for a particular user. Configuration must occur once in the beginning, and may occur after that in order to fine tune the operation of the sleep timer. The sleep timer may be implemented exclusively by software or combined with hardware. In one or more alternatives, an easy upgrade of existing sleep timers is possible.

Figure 1:
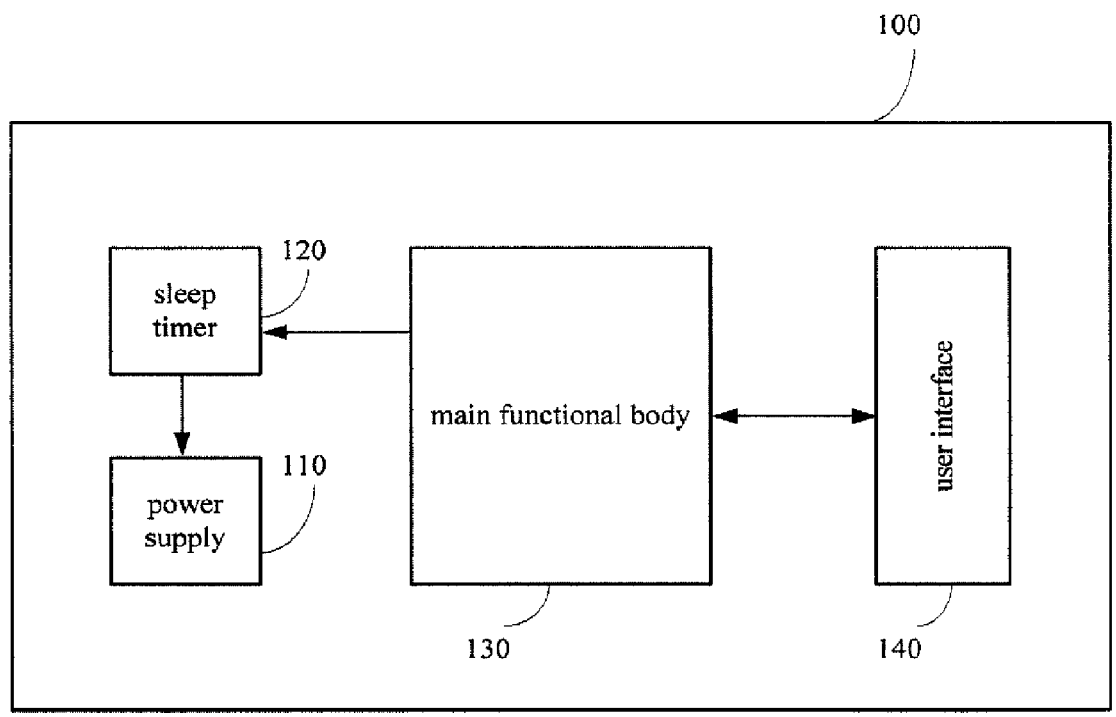
FIG. 1 is a block diagram of a consumer device.

FIG. 1 illustrates a consumer device 100 such as, a TV, a receiver, a video recorder, a CD-player, a DVD-player, a CD/DVD changer, a vehicle entertainment and information device, an amplifier, a set-top box, a satellite receiver, a printer, a copying machine, or a unit of household equipment that includes a power supply 110 and a sleep timer 120. The sleep timer 120 may control the power supply 110. A user interface 140 may include a remote control or a keyboard. The user interface may enable a user to interact with the main functional body 130 of the device. The main functional body 130 of the device performs the main operation of the device, which may include receiving and processing television signals for display on a television screen, and supplies detected user interaction data to the sleep timer 120. Based on the received interaction data, the sleep timer 120 determines the point of time when the power supply 110 should change the power state of a device.

Figure 2:
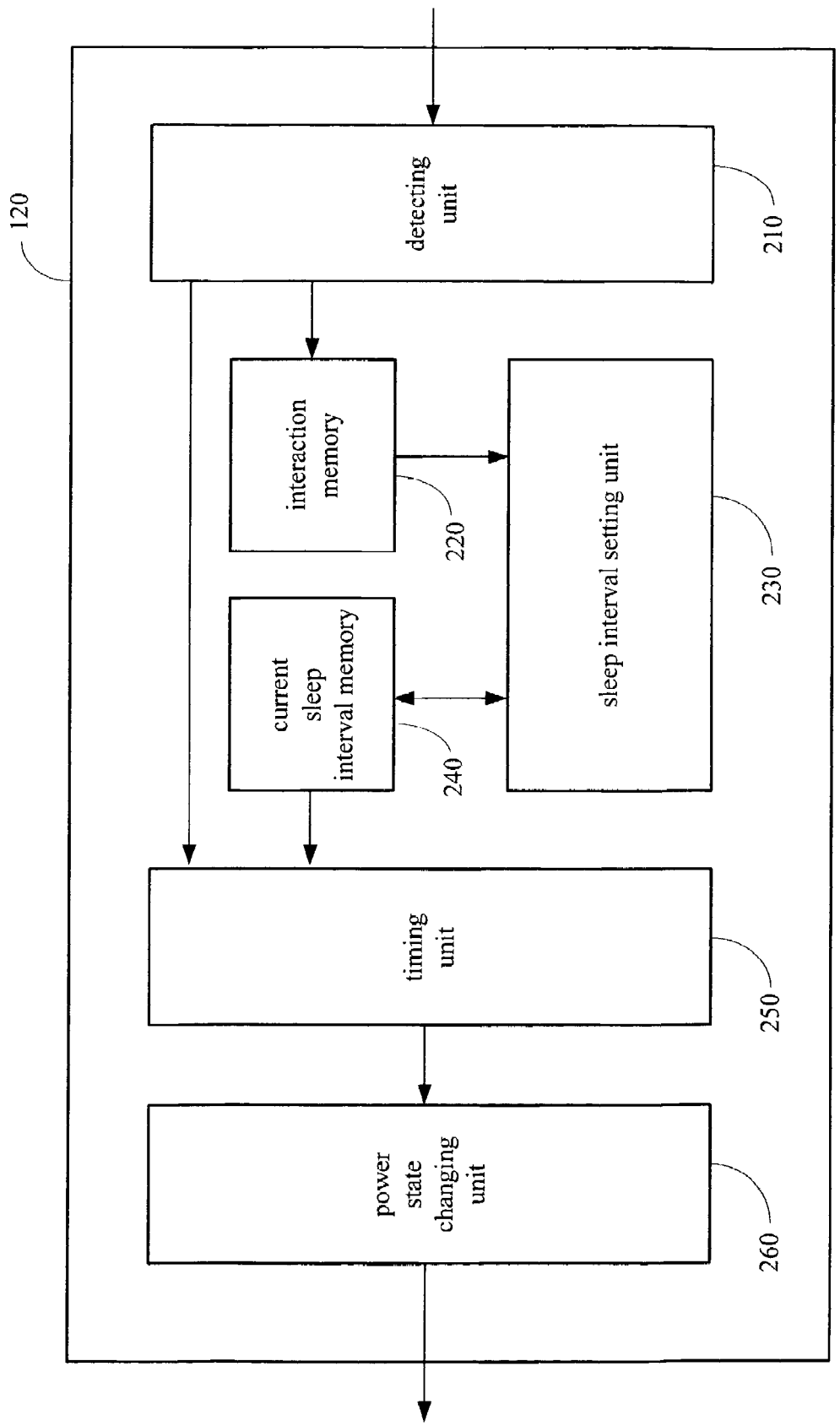
FIG. 2 is a block diagram of a sleep timer of FIG. 1.

FIG. 2 is a block diagram of a sleep timer 120. Sleep timer 120 may include a detector (detecting unit) 210, an interaction memory 220, a sleep interval setting unit 230, a current sleep interval memory 240, a timer (timing unit) 250 and a power unit (power state changing unit) 260. Each time the detecting unit 210 detects an interaction of the user with the controlled device, the data reflecting the details of the interaction may be stored in interaction memory 220. The maximum number of interaction data elements that may be stored depends on the available memory space provided by the device. The data may be stored in the memory in a first in first out (FIFO) manner.

The sleep interval setting unit 230 may read the data stored in interaction memory 220, compare that data with the sleep interval stored in current sleep interval memory 240, and if necessary define a new sleep interval. By increasing the amount of data detected and stored, the resulting sleep interval may better correspond to the long-time behaviour of the user. In contrast, a smaller amount of detected data may be stored in order to enable a faster adaptation to a change in the user's behaviour.

Every newly determined sleep interval value may be stored in the current sleep interval memory 240. Each time a new sleep interval value is determined the current sleep interval memory 240 is updated such that the previously stored sleep interval value is overwritten. The sleep interval setting unit 230 may refresh the current sleep interval value each time the user interacts with the device. One exemplary way to refresh the current sleep interval value is to have the sleep interval setting unit 230 read the time interval between the last two interactions from the interaction memory 220 and compare this value to the current sleep interval stored in the current sleep interval memory 240. If the values are different, the sleep interval setting unit 230 may update the sleep interval value stored in the current sleep interval memory 240. In this manner, a complete analysis of the stored interaction data history may be avoided upon detection of each new user interaction. Additionally, the computational processing power associated with the sleep timer may be reduced.

The timing unit 250 obtains the current sleep interval from the current sleep interval memory 240 and tracks the time elapsed after the last detected interaction. If the elapsed time is equal to or larger than the current sleep interval value, a power state change may be initiated.

Alternatively, timing unit 250 may start tracking from any other occurrence in order to measure the elapsed time. This occurrence may be the time when the controlled device is powered on. This means that the power state of the controlled device may be changed after a time interval, to be adjusted based on a user's interaction data history, has elapsed since a fixed point of time.

Figure 3:
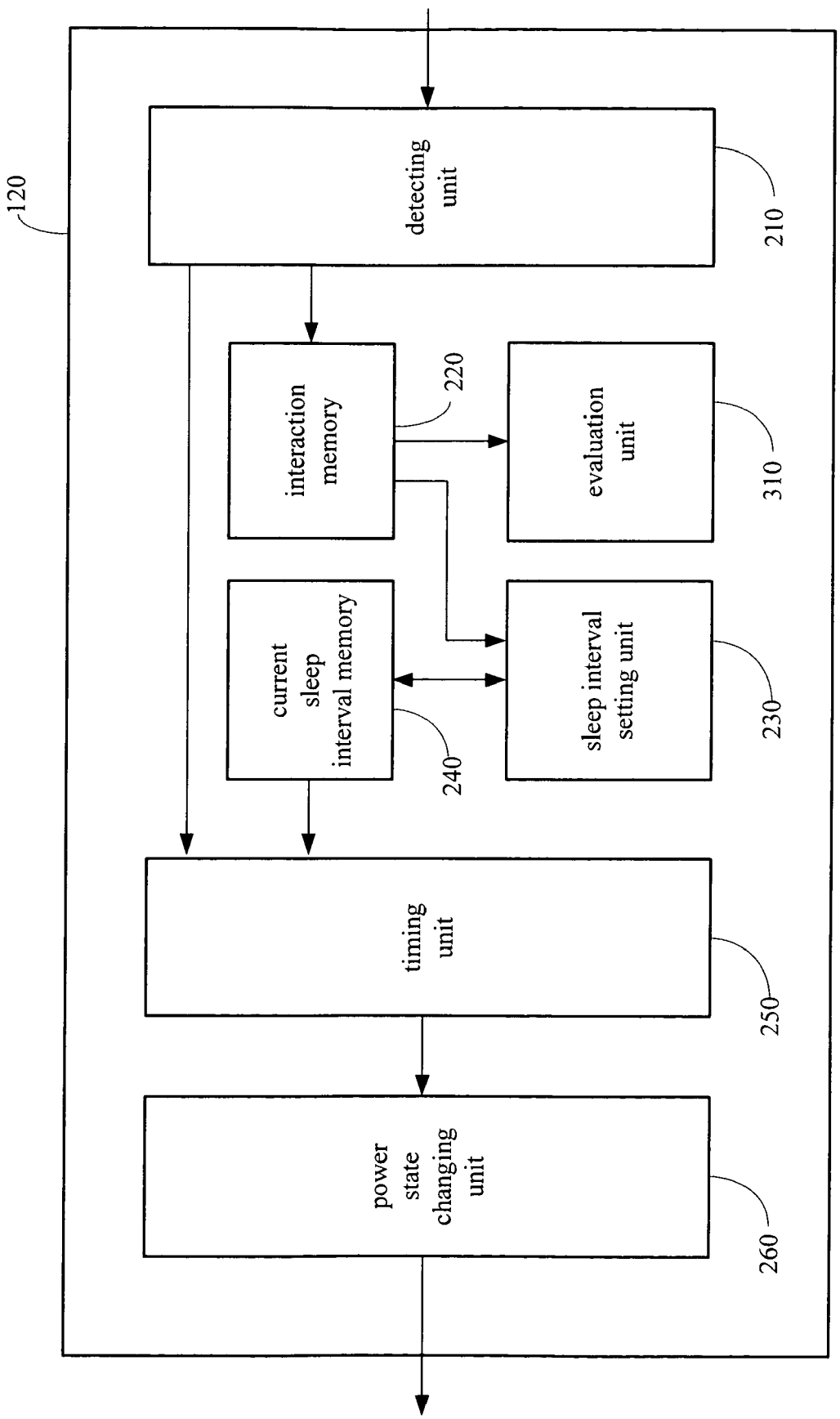
FIG. 3 is an alternate block diagram of a sleep timer of FIG. 1.

FIG. 3 is an alternate block diagram of a sleep timer of FIG. 1. In FIG. 3, a sleep timer further includes an evaluation unit 310. The evaluation unit 310 may receive the interaction data stored in the interaction memory 220. Based on the user interaction data history stored in the interaction memory 220, the evaluation unit 310 may perform statistical evaluations. The evaluation results may include statistical data such as the minimum length of a time interval between two subsequently detected user interactions, the maximum length of a time interval between two subsequently detected user interactions, the average length of a time interval between two subsequently detected user interactions, the interval representing the difference between the maximum and the minimum length of a time interval, or the median value of a sorted list of interaction time intervals. The evaluation results may be stored in a volatile or non-volatile memory. This memory may be the interaction memory 220 or another memory unit.

When calculating a median value, the evaluation unit 310 creates a sorted list of calculated time intervals between two subsequent user interactions. The calculated values may be arranged in either an ascending or a descending order. The value near the middle of this list may be selected as the median value. For exemplary purposes, if the sorted list includes 9 calculated time interval values, the $5^{th}$ value of the list may be selected as the median. Alternatively, any other statistical evaluation may be performed. The evaluation process may calculate other values than those mentioned above, or only calculate a predefined subset of values for determining an updated sleep interval.

The statistical evaluations may be performed in a manner such that a more frequent occurrence of user interactions with the controlled device reflects the need to extend the sleep interval. Alternatively, a longer time period without any user interaction may indicate the need to shorten the time interval before switching off the controlled device.

Figure 4:
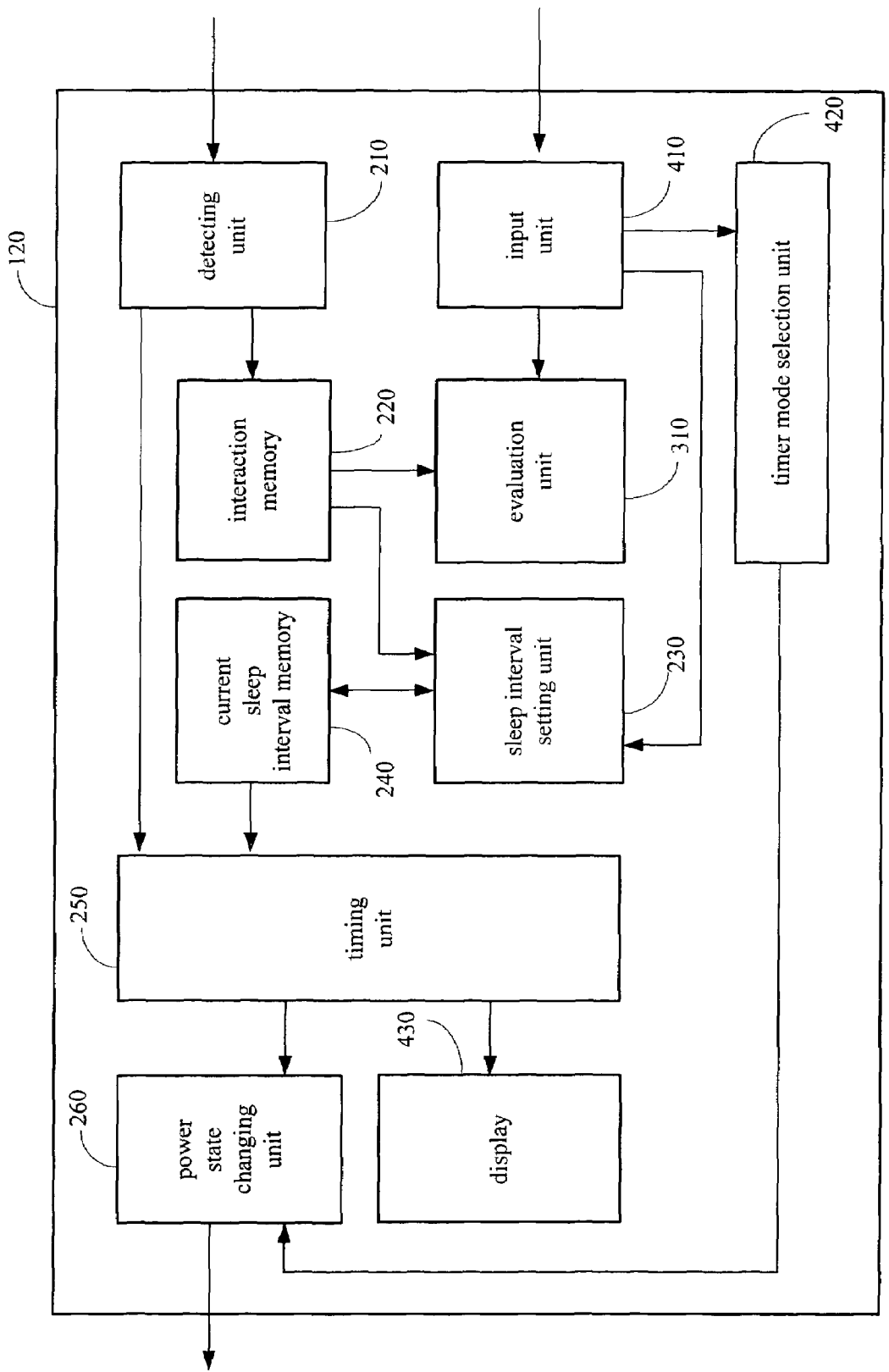
FIG. 4 is a second alternate block diagram of a sleep timer of FIG. 1.

FIG. 4 is a second alternative block diagram of a sleep timer of FIG. 1. FIG. 4 additionally includes an input (input unit) 410, a timer mode selection unit 420, and a display 430. The data inputted by a user through the input unit 410 may be used for setting the processing mode of the evaluation unit 310. Only one of the above mentioned statistical evaluations may be stored in the interaction memory 220 and used as a basis for the determining the sleep interval.

Further, the user input may control the operation of the sleep interval setting unit 230. Through the user input unit 410, an individual offset time may be added to the result of the statistical evaluation used to determine the sleep interval. The sleep interval calculation may be expressed by the following equation:

$$\text{Time\_until\_standby} = \text{selected\_result\_of\_statistical\_evaluation} + \text{individual\_offset}$$

The individual offset may be programmed generally or may differ in accordance with the type of detected user interaction.

The parameters which define individual sleep timer strategies may be individually set for different periods of the day. The time borderlines between different periods of the day may be input to the timer mode selection unit 420 via user input unit 410. According to the predefined user selected timer modes, the timer mode selection unit 420 may control various functional blocks of the sleep timer. As shown in FIG. 4, the timer mode selection unit 420 may deactivate the power state changing unit 260 during certain periods of the day such that the sleep timer 120 may not change the power state of a controlled device. Aside from the power state changing unit 260, the timer mode selection unit 420 may control other units of the sleep timer.

Before a power state change is initiated, timing unit 250 may display a notification on display 430 informing the user that a power state change will occur soon. Unless the user interacts with the controlled device, the sleep timer initiates a power state change after a predetermined amount of time has expired.

For exemplary purposes, the following is a description of an analysis of user interaction data. It is assumed that a user interacted with the controlled device 10 times, and the following time-intervals have been recorded (10 interactions result in 9 time-intervals):

approximately 01 min
approximately 03 min
approximately 19 min
approximately 33 min
approximately 05 min
approximately 23 min
approximately 16 min
approximately 53 min
approximately 42 min The user interaction with the controlled device has been monitored for approximately 3 hours and 15 minutes ([1+3+19+33+5+23+16+53+42] approximate min=approximately 195 min=approximately 3 hrs15 min). To obtain the sorted list the individual time differences may be sorted in either ascending or descending order. If we sort the data in ascending order, we get the following sorted list of approximate time intervals: 01 min/03 min/05 min/16 min/19 min/23 min/33 min/42 min/53 min. From this list, some statistical evaluation results may be obtained. The minimal value of the time interval between two subsequent interactions is $x_{min}$=approximately 1 min, the maximum value of the interval is $x_{max}$=approximately 53 min, the average value of all the time intervals between two subsequent user interactions is $x_{avg}$=(approximately 195 min)/9=approximately 21 min, the span of the values of the interval is $x_{span}=x_{max}-x_{min}$=(approximately 53 min)−(approximately 1 min)=approximately 52 min, and the median value of the sorted list (we have an odd number of values) is $x_{med}$=value of (["number of intervals"*½])=value of ([9*½])=value of (5)=approximately 19 min. Therefore, the fifth value, approximately 19 min., is the median value.

These are just some possible results of the statistical evaluations. The user may select which result should be used for the sleep interval calculation. This can be either one of the above mentioned values, a combination of those values, or any other statistical result. Moreover, the user may combine the selected result of the statistical evaluation with a freely selectable offset value. Thereby the user is given freedom to set the sleep timer in accordance with the user's individual needs.

For exemplary purposes, it is assumed that the user has chosen an individual offset time of approximately 45 min. Using the 5 statistical results described above, the following sleep interval times are calculated by adding the offset value of approximately 45 min:

Using $x_{min}$->approximately 1 min+approximately 45 min=approximately 46 min

Using $x_{max}$->approximately 53 min+approximately 45 min=approximately 98 min

Using $x_{avg}$->approximately 21 min+approximately 45 min=approximately 66 min

Using $x_{span}$->approximately 52 min+approximately 45 min=approximately 97 min Using $x_{med}$->approximately 19 min+approximately 45 min=approximately 64 min If the user selected the sleep timer strategy of using the maximum value combined with an individual offset of approximately 45 min, the device may be automatically switched to standby-mode after approximately 98 min of no user interaction with the controlled device.

For exemplary purposes, the following describes how the sleep timer may react if the number of detected interaction data points exceeds the capacity of the interaction memory 220. For exemplary purposes, it is assumed that the number of 9 collected user data as described above is the maximum capacity of the interaction memory 220. Moreover, for exemplary purposes, it is assumed that the user has not fallen asleep so far and has interacted with the controlled device 4 more times. The following 4 new monitored time-intervals between two subsequent user interactions are:

approximately 33 min
approximately 78 min
approximately 36 min
approximately 21 min Because, according to the above parameters, the maximum number of time interval values that may be stored in the memory is 9, the 4 new values shift out the first 4 values detected. Therefore, the new unsorted list of time-intervals would be:

approximately 05 min
approximately 23 min
approximately 16 min
approximately 53 min
approximately 42 min
approximately 33 min
approximately 78 min
approximately 36 min
approximately 21 mm This means, that the monitored user interaction which will be used for evaluation is now approximately 5 hours and 7 minutes [(5+23+16+53+42+33+78+36+21) approximate min=approximately 307 min=approximately 5 hrs07 min].

Sorting the recorded interaction time interval data once more in ascending order results in the following sorted list of approximate time intervals: 05 min/16 min/21 min/23 min/33 min/36 min/42 min/53 min/78 min. The minimal value now is $x_{min}$=approximately 5 min, the maximum value is $x_{max}$=approximately 78 min, the average value changes to $x_{avg}$=(approximately 307 min)/9=approximately 34, the span is $x_{span}=x_{max}-x_{min}$=(approximately 78 min)–(approximately 5 min)=approximately 73 min, and the median value of the new sorted list (we have an odd number of values) is $x_{med}$=value of (["number of intervals"*½])=value of ([9*½])=value of (5)=approximately 33 min. Therefore, the fifth value, approximately 33 min., is the median value.

For explanatory purposes, it is assumed that the user did not change the individual offset time of approximately 45 min. Therefore, the resulting possible sleep interval time values corresponding to the different statistical evaluation results described above and calculated after the 4 newly detected user interactions are:

Using $x_{min}$->approximately 5 min+approximately 45 min=approximately 50 min

Using $x_{max}$->approximately 78 min+approximately 45 min approximately 123 min Using $x_{avg}$->approximately 34 min+approximately 45 min=approximately 97 min Using $x_{span}$->approximately 73 min+approximately 45 min=approximately 118 min Using $x_{med}$->approximately 33 min+approximately 45 min=approximately 78 min For explanatory purposes, it is assumed that the user did not change the sleep timer strategy and therefore continues to use the maximum value of the time interval between two subsequent interactions combined with an individual offset of approximately 45 min. Employing this sleep timer strategy, the time required to elapse after the last detected user interaction before the sleep timer automatically switches the device into standby changes from approximately 98 min to approximately 123 min.

Figure 5:
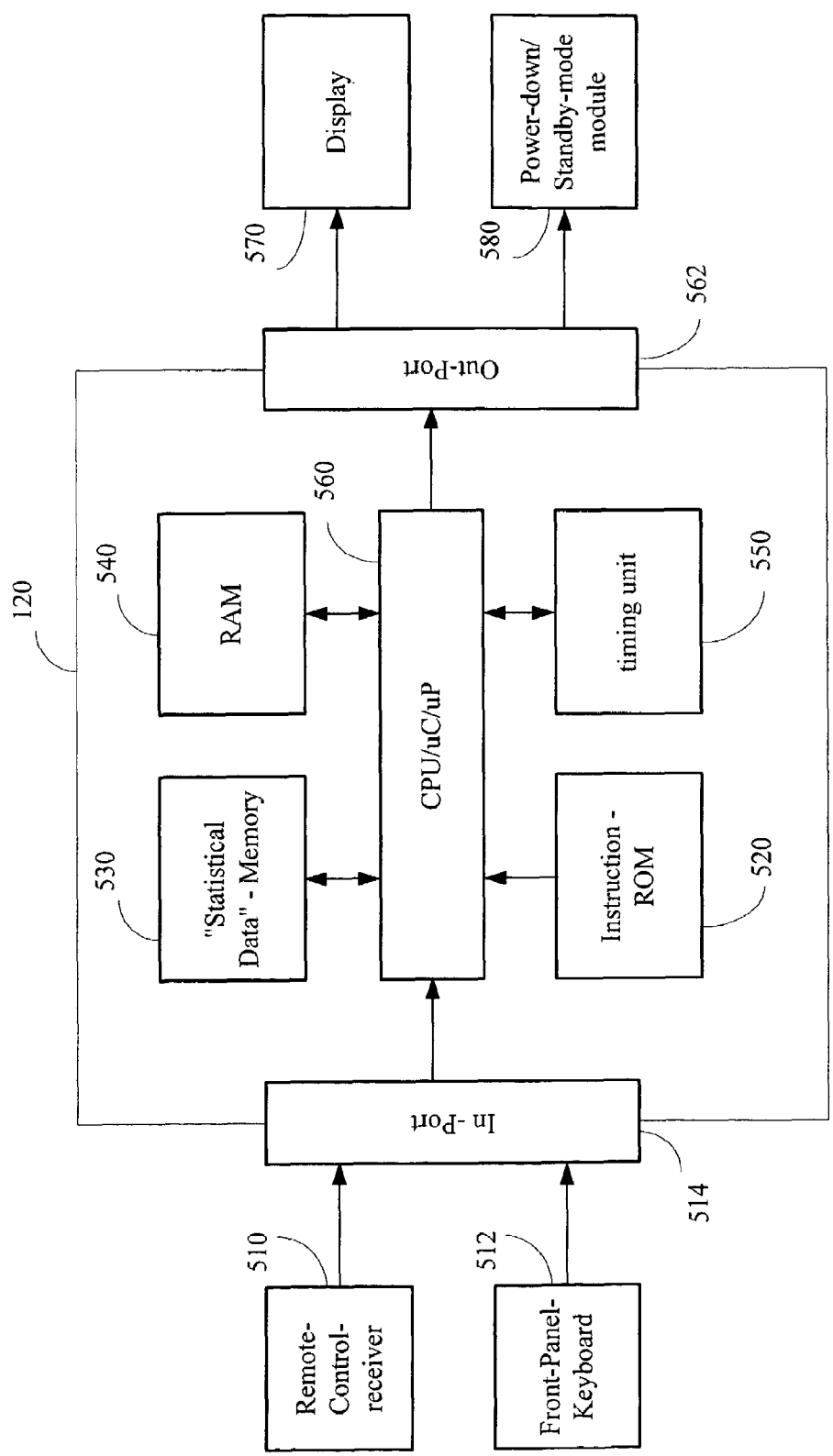
FIG. 5 is a third alternate block diagram of a sleep timer of FIG. 1.

FIG. 5 is a third alternative block diagram of a sleep timer of FIG. 1. The sleep timer 120 further includes an input interface 514 for receiving control commands from a remote control receiver 510 and/or from a front panel keyboard 512. The input interface 514 may further detect a user interaction for adjusting a sleep interval. Alternatively, the detection function may be associated with another functional block of the sleep timer 120 of FIG. 5 or be provided as a separate functional block. Additionally, the remote control and front panel keyboards may also be used for inputting control commands to the sleep timer.

The functionality of the evaluation unit, the sleep interval setting unit and the memory may be implemented by a central processing unit (CPU), micro controller (μC) or micro processor (μP) 560, a statistical data memory 530, and a non-volatile or volatile memory, such as a random access memory (RAM) 540. A non-volatile memory, such as programmable read-only memory (PROM), erasable programmable read-only memory (EPROM), electrically erasable programmable read-only memory (EEPROM), or instruction-read-only memory (ROM) 520 contains the program instructions for the handling of the statistical data by the CPU 560.

A timing unit 550, tracking the time elapsed since a last detected user interaction, may be reset by CPU 560 upon each detection of a user interaction. Similarly, the CPU 560 may activate the timing unit 560 based on the current sleep interval length. When the timing unit value equals the current sleep interval, the timing unit 550 may inform the CPU 560 accordingly. The CPU 560 may in turn issue a notification to display 570 via output port 562 as well as a signal to the power-down/standby module 580 in case a power state change has to be preformed.

Figure 6:
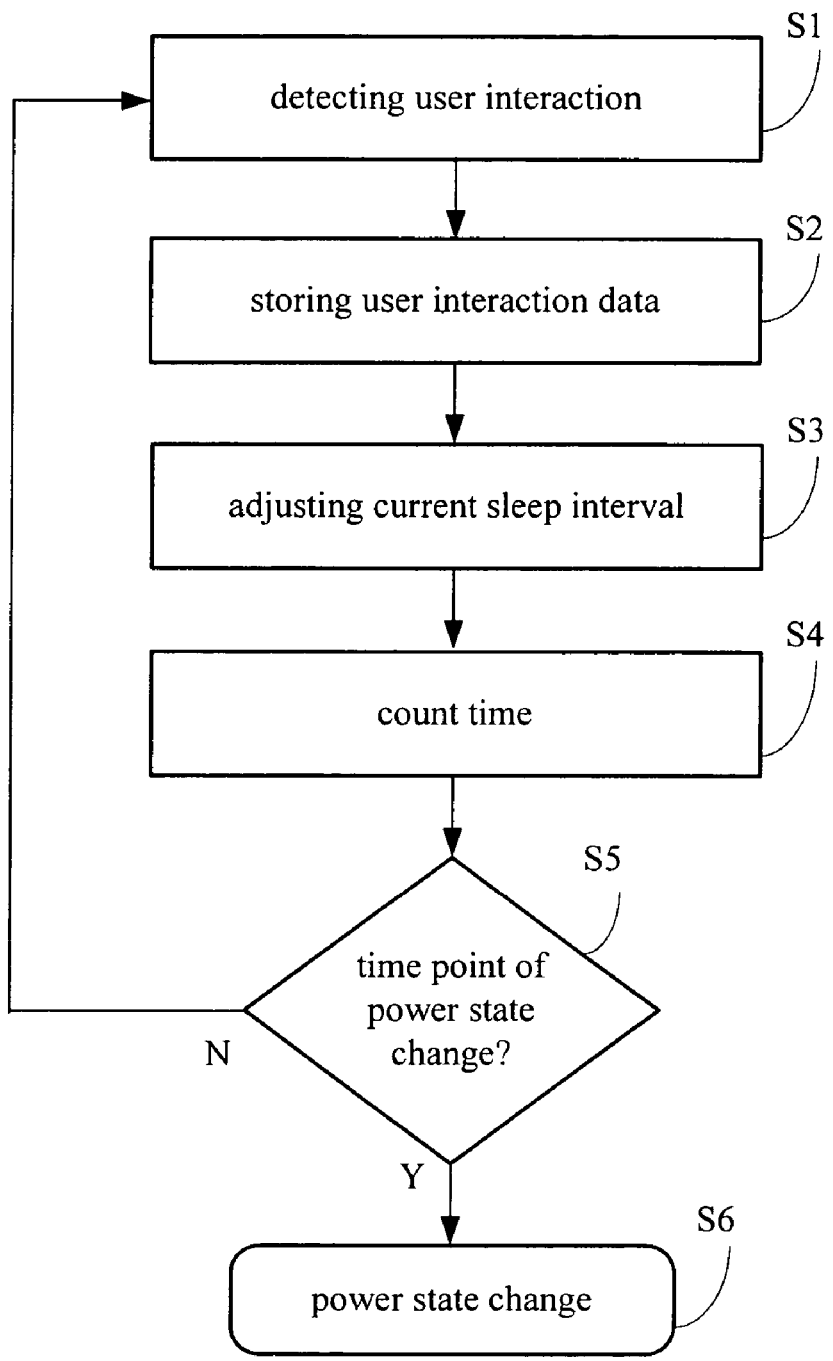
FIG. 6 is a flow diagram of a sleep timer.

FIG. 6 is a flow diagram of a sleep timer. User interaction with the controlled device is detected at step S1. The corresponding interaction data is stored in a memory at step S2. A user interaction may be any manipulation of a movable piece, switch, or a button on the controlled device itself, on a remote control unit, or on another device. The interaction data may be either a timestamp, recording in order the absolute (or relative) time points of the detected interaction, or the time intervals between subsequent interactions.

When the interaction data represents the absolute time points of detected interaction it is possible to account for changes to the sleep timer. If a user interaction changes a parameter of the sleep timer (e.g., the borderline between different periods of the day) the statistical evaluations may be recalculated based on the changed parameter.

The (re-) calculation of statistical evaluations based on the stored timestamps should not take time periods into account during which the controlled device is inactive. While storing the absolute time points of detected interaction, an additional timestamp may be stored in the memory indicating each power-on or power-off operation. Based on this additional timestamp, the time intervals during which the controlled device was not in use may be easily excluded from evaluation. Alternatively, the evaluation of the user's interaction activity may be performed only on the basis of the data from the current activation period. The sleep timer should not take into account those timestamps, which have been stored before the last power-on of the controlled device. Based on the additional timestamp indicating power-on or power-off operation the interaction data of the current activation period can be easily distinguished from those of earlier activation periods. This may benefit different users with different behaviours that subsequently use the same controlled device.

Alternatively, the interaction data may represent the time interval between two subsequent user interactions with the controlled device. The time interval may be determined by tracking and storing the intervals between two subsequent user interactions with the controlled device. When a user interaction with the controlled device is detected, a current tracking value is saved. After detection of each user interaction, the tracking value is reset and activated again for the next user interaction. Measuring and storing the time intervals between subsequent user interactions automatically excludes periods when the device is inactive. However, in case of a change of the borderlines between periods of the day for the timer processing modes, the "old" interval values stored previously must be either deleted, or some failure occurs directly after the change.

At step S3, the adjustment of the current sleep interval is performed. The adjustment may be subject to one or many statistical evaluations. Step S4, tracks the time elapsed from the last detected user interaction. At step S5, a check is performed to determine if the time elapsed from the last detected user interaction satisfies the current sleep interval. If the current sleep interval has not elapsed, the sleep timer continues to detect user interactions as step S1. Upon detection that the time of the current sleep interval has elapsed, the time point of a power state change has been reached and the power state change is performed at step S6.

Figure 7:
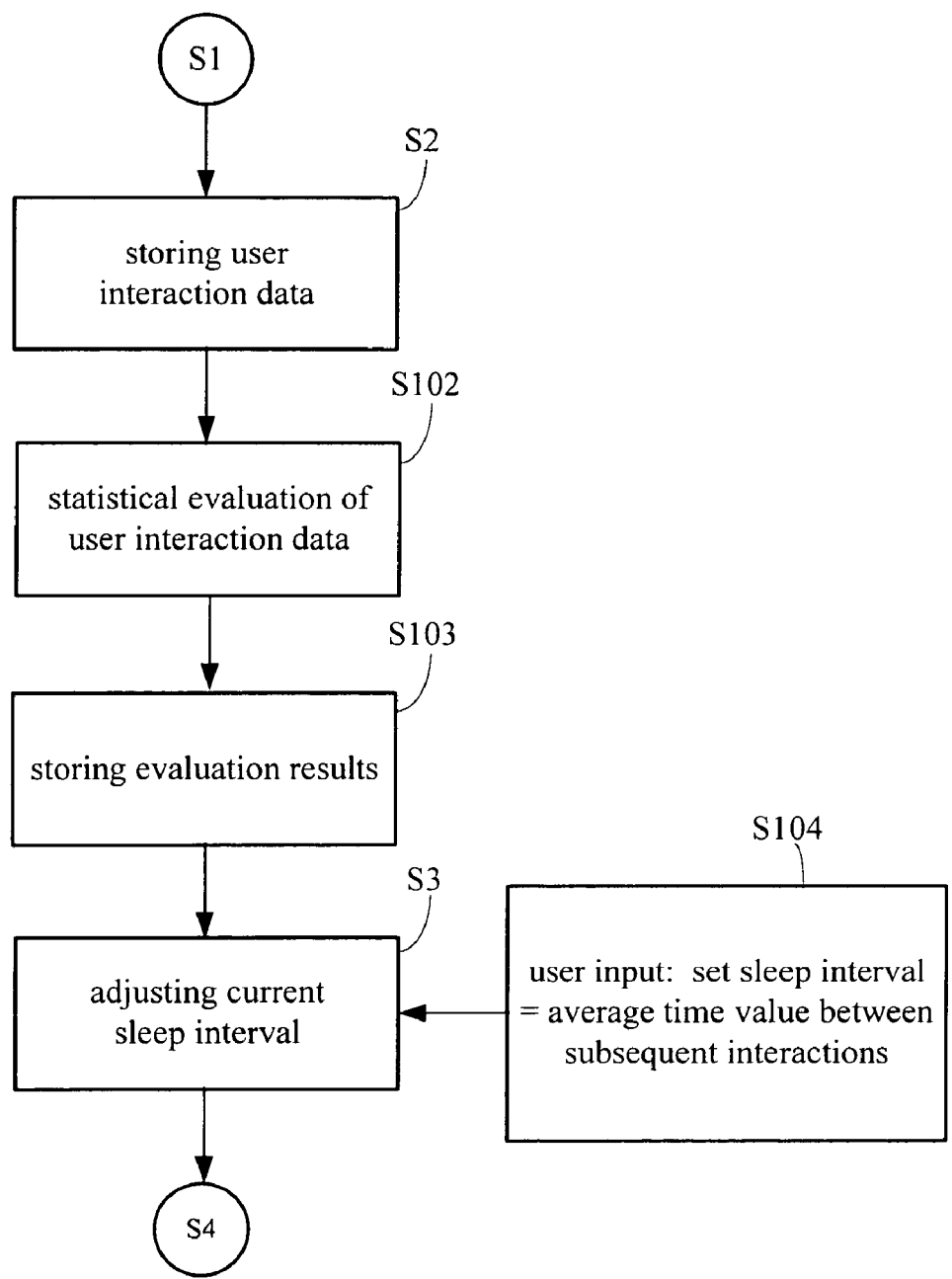
FIG. 7 is a more detailed diagram illustrating a portion of FIG. 6.

FIG. 7 is a more detailed flow diagram illustrating a portion of FIG. 6. At step S2, interaction data is stored in a memory. At step S102, the stored interaction data of step 2 are subjected to predefined statistical evaluations. The statistical evaluations may calculate various statistical values based on the stored interaction data. The results of the statistical evaluations may include such values as the minimum value of time between two subsequent user interactions, the maximum value of time between two subsequent user interactions, the average value of all time intervals between two subsequent user interactions, the range of the values of the intervals, or the median of all or some of the time intervals between two subsequent user interactions. At step S103, the results of the evaluations are also stored in a memory. The stored evaluation results may be employed for adjusting the current sleep interval at step S3. The current sleep interval may be stored in a separate memory or a memory integrated with the logic of the controlled device.

At step S104, user inputs may be provided to set parameters for adjusting the current sleep interval. Parameters may include which evaluation result will be utilized to adjust the sleep interval or the amount of offset time a user desires to add to the selected evaluation result. Additionally, the user input may assign the sleep timer strategy desired by the user.

Figure 8:
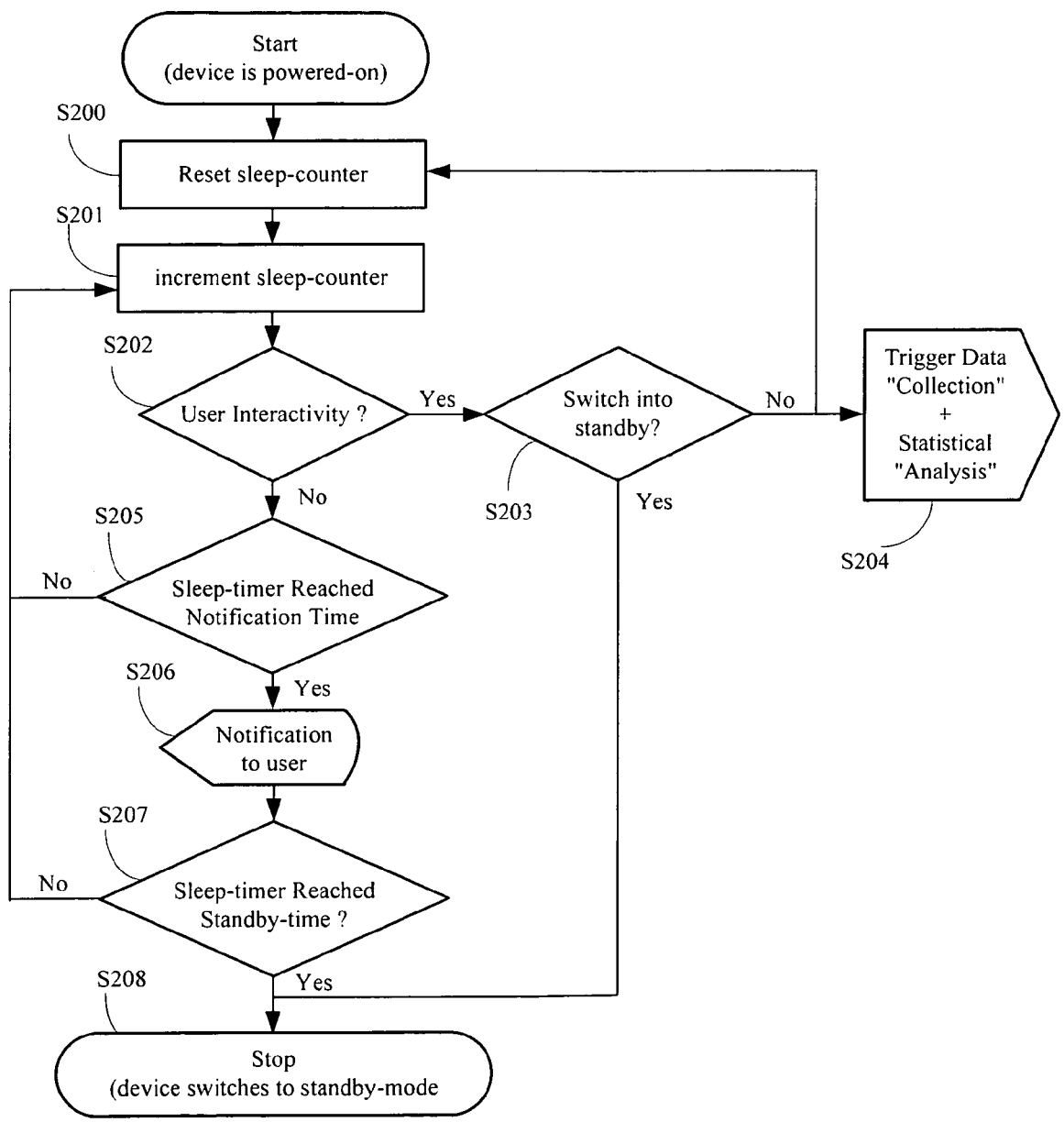
FIG. 8 is a flow diagram illustrating operation of a sleep timer.

FIG. 8 illustrates an exemplary flow diagram where the sleep timer switches a device to a standby mode after a certain time interval has elapsed. The time remaining before a power state change is initiated is calculated by a sleep counter. At step S200, a sleep counter is reset after powering-on a controlled device. During operation of the controlled device, the user's interaction activity is continuously monitored. While there is no user interaction with the controlled device, time passes and the sleep counter is incremented at step S201. At step S202, a check is performed to see if any user interaction has been detected. If step S202 detects use interaction, then a check is performed at step S203 to see whether the user desires to manually switch the controlled device into a standby mode. A manual switch into a standby mode results in the controlled device being switched to a standby mode at step S208.

If a manual switch into a standby mode is not detected at step S203, the user's interaction data history is updated at step S204. Updating the user's interaction data history may additionally cause statistical evaluations to be performed in accordance with the selected parameters of the sleep timer, as well as an adjustment to the sleep interval value. Moreover, the sleep counter is reset and the workflow of the sleep timer starts again at step S200.

If no user interaction is detected at step S202, the count value of the sleep timer is continuously monitored and compared with a notification time. The notification time represents a certain point of time lying a predefined time period before the sleep interval completely elapses. At step S205, a check is performed to determine if the notification time has been reached by the current count value. If the notification time has not been reached by the current count value, the sleep counter continues to increment at step S201. Otherwise, a notification to the user may be output at step S206. To avoid the forthcoming automatic switch into the standby mode, the user may react to the notification by any interaction with the device.

If the user does not respond to the notification, the count value of the sleep timer is compared to the length of the sleep interval at step S207. If the sleep timer has not yet reached the sleep interval, the sleep timer continues to increment at step S201. When the sleep timer reaches the sleep interval, the controlled device is automatically switched into standby mode at step S208, and the sleep timer operation is terminated.

Although the sleep counter operation has been described by incrementing a count value continuously, other operations may be implemented. For instance, the sleep counter may be implemented in reverse manner by decreasing a given start value. Upon reaching a fixed value, the notification to the user is issued and upon reaching the count value "zero", the device's power state is switched.

For explanatory purposes, the advanced sleep timer operation is described where the advanced sleep timer parameters are assumed to be set as follows:

timer is disabled during the daytime period of the day timer is enabled during the nighttime period of the day the time-value to change between daytime and nighttime is set to approximately 7 p.m.

the statistical average interaction interval used for the sleep interval adjustment is approximately 33 min the individual offset is set to approximately 55 min the notification time before standby is set to approximately 3 min The user switches on the device at 5 p.m. Many or all user interaction is monitored, but because it is earlier than 7 p.m., the device will not be automatically set into standby. When time goes by and passes 7 p.m., the nighttime period settings become effective. User interaction is still monitored and statistically evaluated. Upon detection of each user interaction, the counter is reset. If the detected user interaction stops, which may be a result of a user which has fallen asleep, the counter is not reset. The count value is continuously incremented until the counter reaches approximately 85 min. The value of 85 min corresponds to the following calculation:

$$\text{average interaction interval} + \text{individual offset} - \text{notification time before standby} = \text{approximately } 33 \text{ min} + \text{approximately } 55 \text{ min} - \text{approximately } 3 \text{ min}$$

At approximately 85 min, a notification to the user may be output informing the user that the device will soon change into standby mode. If no further user interaction is detected and the counter reaches a count value corresponding to approximately 88 min (average interaction interval+individual offset), the device will be automatically switched to a standby mode.

Figure 9:
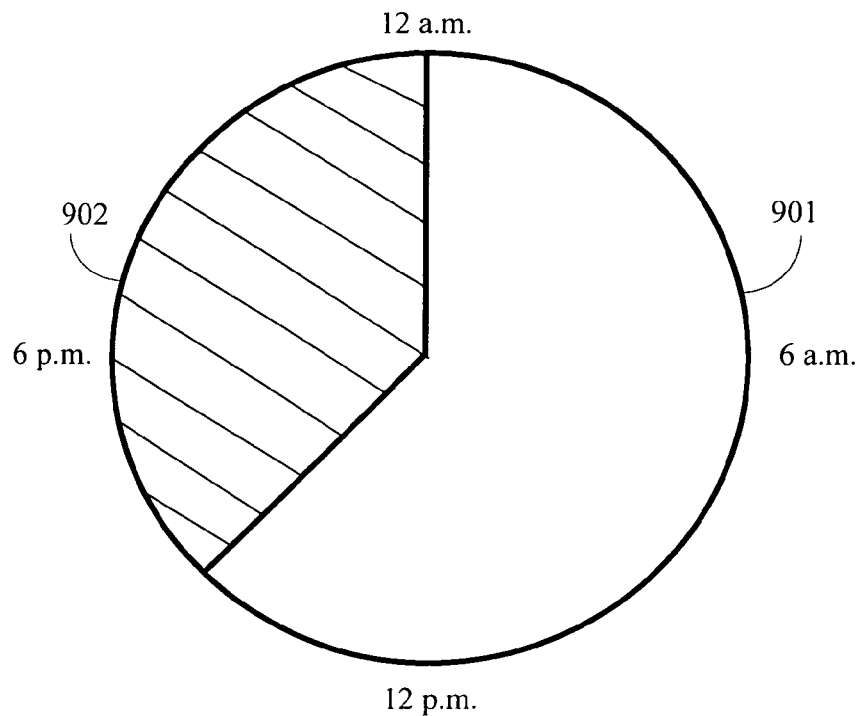
FIG. 9 is a representation of two time periods.

FIG. 9 is a schematic representation of two time periods of the day. Each of the time periods is associated with a different working mode of the sleep timer. In the given example, the first time period 901 corresponds to the daytime and the second time period 902 corresponds to the nighttime. As shown in FIG. 9, a switch from daytime to nighttime occurs at 3 p.m., while at midnight the timer mode is reset to the daytime mode.

Figure 10:
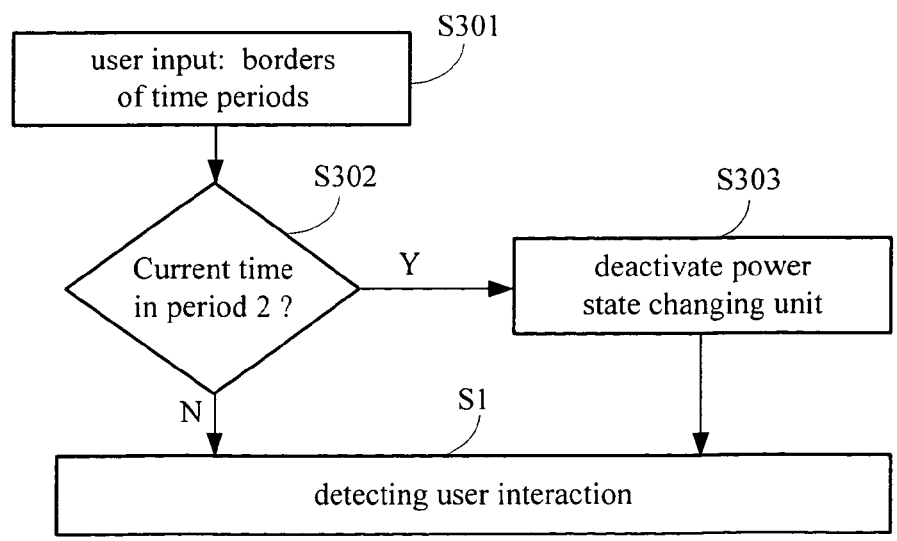
FIG. 10 is a partial flow diagram illustrating operation of a sleep timer using different time periods.

The different time periods of the day may be taken into account by the sleep timer in order to prevent a power state change during daytime periods when they are most likely not required. FIG. 10 illustrates an exemplary flow diagram showing the different processing procedures applied during different periods of the day. At step S301, a user sets the borderlines of the periods of the day. The borderlines may be used to designate different periods of the day when the power state change functionality may be disabled (e.g., period 2) and when the power state change functionality may be enabled (e.g., period 1). The period of the day is continuously monitored at step S302. If the current period of the day falls within period 2, the power state changing unit is deactivated at step S303. Deactivation of the power state changing unit prevents the sleep timer from performing any power state changes. If the current period of the day does not fall within period 2, the sleep timer checks for user interaction at step S1. Although FIG. 10 illustrates only two periods of the day, corresponding to two timer modes, the sleep timer may be configured with additional time periods and additional timer modes.

The methods shown in FIGS. 6, 7, 8, and 10 may be encoded in a signal bearing medium, a computer readable medium such as a memory, programmed within a device such as one or more integrated circuits, or processed by a controller or a computer. If the methods are performed by software, the software may reside in a memory resident to or interfaced to the sleep timer 120 or any type of communication interface. The memory may include an ordered listing of executable instructions for implementing logical functions. A logical function may be implemented through digital circuitry, through source code, through analog circuitry, or through an analog source such as through an electrical, audio, or video signal stored or processed by logic. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A sleep timer for changing a power state of a device related to a sleep interval, comprising:
    a detector that detects user interactions with the device while the device is in an active state;
    a memory coupled to the detector that stores a user interaction data history;
    an evaluation unit coupled to the memory that performs a statistical evaluation of the stored user interaction data history;
    an input coupled to the evaluation unit that receives instructions, the instructions comprise sleep timer parameters;
    a sleep interval setting unit that adjusts the sleep interval based on the stored user interaction data history;
    a timer coupled to the memory and to the detector that determines a power state changing point in time based on the sleep interval; and
    a power unit coupled to the timer that initiates a power state change of the device.

2. A sleep timer according to claim 1, where the detector detects data selected representing timestamps of user interactions, or time intervals between two subsequent user interactions.

3. A sleep timer according to claim 2, where the detector detects a type of user interaction and the memory stores the type of the user interaction.

4. A sleep timer according to claim 1, where the sleep interval is based on the results of the statistical evaluation.

5. A sleep timer according to claim 1, where the sleep interval setting unit receives instructions for calculating the sleep interval.

6. A sleep timer according to claim 1, where the instructions include an offset time.

7. A sleep timer according to claim 1, where the sleep interval setting unit selects one of a plurality of predefined alternatives for applying the statistical data provided by the evaluation unit.

8. A sleep timer according to claim 1, further comprising a timer mode selection unit coupled to the input and to the power unit that selects one of a plurality of processing modes for the evaluation unit, the sleep interval setting unit, the timer, or the power unit.

9. A sleep timer according to claim 8, where the timer mode selection unit performs the timer mode selection based on data selected from the current time of day or the instructions.

10. A sleep timer according to claim 1, adapted to provide a notification to a user at a predetermined notification interval before the power state changing point in time.

11. A sleep timer according to claim 10, where the predetermined notification interval is configured by the instructions.

12. A sleep timer according to claim 10, further comprising a display coupled to the timing unit that provides a menu for selecting one of the plurality of predefined alternatives for applying the statistical data provided by the evaluation unit.

13. A sleep timer according to claim 12, where the display is adapted to indicate the data stored in the memory and the results of the statistical evaluation.

14. A sleep timer according to claim 1, where the timer determines the power state changing point in time based on an elapsed time from a last detected user interaction.

15. A sleep timer according to claim 1, where the timer determines the power state changing point in time based on an elapsed time from the last activation of the device.

16. A sleep timer according to claim 1, where the power unit is adapted to change the power state of the device from active to standby.

17. A sleep timer according to claim 1, where the power unit is adapted to power off the device.

18. A sleep timer according to claim 1, where the device comprises a TV, a receiver, a video recorder, a CD-player, a DVD-player, a CD/DVD-changer, a vehicle entertainment and information device, an amplifier, a set-top-box, a satellite-receiver, a printer, a copying machine, or a unit of household equipment.

19. A method for changing a power state of a device related to a sleep interval, comprising:
    inputting instructions for calculating the sleep interval;
    detecting user interactions with the device while the device is in an active state;
    storing a user's interaction data history with the device;
    adjusting the sleep interval based on the stored user's interaction data history;
    determining a power state changing point in time based on the sleep interval; and initiating the power state change of the device at the power state changing point in time.

20. A method according to claim 19, where the detecting step detects data representing timestamps of user interactions, or time intervals between two subsequent user interactions.

21. A method according to claim 20, where the detecting step detects a type of user interaction and the storing step stores the type of user interaction.

22. A method according to claim 20, further comprising the step of a statistical evaluation of the stored user interaction data history.

23. A method according to claim 22, further storing results of the statistical evaluation step.

24. A method according to claim 23, where the sleep interval is based on results of the statistical evaluation.

25. A method according to claim 24, further comprising an input step for inputting instructions, the instructions comprising sleep timer parameters.

26. A method according to claim 25, where the sleep interval adjusting step receives instructions for calculating the sleep interval.

27. A method according to claim 25, where the instructions include an offset time.

28. A method according to claim 25, where the sleep interval adjusting step selects one of a plurality of predefined alternatives for applying the statistical data provided by the statistical evaluation step.

29. A method according to claim 25, further comprising a timer mode selection step that selects one of a plurality of processing modes for the statistical evaluation step, the sleep interval adjusting step, the power state changing point in time determining step, and the power state changing step.

30. A method according to claim 29, where the timer mode selection step performs the timer mode selection based on data selected from the current time of day or the instructions.

31. A method according to claim 25, further comprising a notification step that provides a notification to the user at a predetermined notification interval before the power state changing point in time.

32. A method according to claim 31, where the predetermined notification interval is configured by the instructions.

33. A method according to claim 25, where the power state changing point in time determining step determines the power state changing point in time based on an elapsed time from a last detected user interaction.

34. A method according to claim 25, where the power state changing point in time determining step determines the power state changing point in time based on an elapsed time from the last activation of the device.

35. A method according to claim 25, where the power state changing step changes the power state of the device from active to standby.

36. A method according to claim 25, where the power state changing step powers off the device.

37. A method according to claim 19, wherein the device is selected from the group consisting of a TV-set, a radio, a video recorder, a CD-player, a DVD-player, a CD/DVD-changer, a vehicle entertainment and information device, an amplifier, a set-top-box, a satellite-receiver, a printer, a copying machine, and a unit of household equipment.

38. A signal-bearing tangible medium that stores software for changing a power state of a device related to a sleep interval, comprising:

an input that receives instructions comprising sleep timer parameters;

a detector that converts user interactions into electrical signals;

an evaluation logic that analyzes a periodicity of the electrical signals;

a signal analysis logic that sets the sleep interval based on the results of the evaluation logic; and a power state logic that changes the power state of the device based on the signal analysis logic.

39. A method for changing a power state of a device related to a sleep interval, comprising:

inputting instructions for calculating the sleep interval;

detecting user interactions with a device while the device is in an active state;

storing a user's interaction data history with the device;

calculating the sleep interval based on the stored user's interaction data history; and providing a notification to the user at a predetermined notification interval before changing the power state.

40. A sleep timer for changing a power state of a device related to a sleep interval, comprising:

a detector that detects user interactions with the device while the device is in an active state, where the detector detects data selected representing timestamps of user interactions, or time intervals between subsequent user interactions;

a memory coupled to the detector unit that stores a user interaction data history;

an evaluation unit coupled to the memory that performs a statistical evaluation of the stored user interaction data history;

an input coupled to the evaluation unit that receives instructions, the instructions comprise sleep timer parameters;

a sleep interval setting unit that adjusts the sleep interval based on the stored user interaction data history and the results of the statistical evaluation;

a timer coupled to the memory and to the detector that determines a power state changing point in time based on the sleep interval; and a power unit coupled to the timer that initiates a power state change of the device.

41. A sleep timer according to claim 40, further comprising a timer mode selection unit coupled to the input and to the power unit that selects one of a plurality of processing modes for the evaluation unit, the sleep interval setting unit, the timer, or the power unit.

42. A sleep timer according to claim 40, adapted to provide a notification to a user at a predetermined notification interval before the power state changing point in time.

43. A method for changing a power state of a device related to a sleep interval, comprising:

detecting user interactions and data representing time stamps of user interactions, or time intervals between two subsequent user interactions with the device while the device is in an active state;

storing a user's interaction data history with the device;

performing a statistical evaluation of the stored user interaction data;

storing the results of the statistical evaluation;

receiving inputted instructions, the instructions comprising sleep timer parameters;

adjusting the sleep interval based on the stored user's interaction data history and the results of the statistical evaluation;

determining a power state changing point in time based on the sleep interval; and initiating the power state change of the device at the power state changing point in time.

44. A method according to claim 43, further comprising a timer mode selection step that selects one of a plurality of processing modes for the statistical evaluation step, the sleep interval adjusting step, the power state changing point in time determining step, and the power state changing step

45. A method according to claim 43, further comprising a notification step that provides a notification to the user at a predetermined notification interval before the power state changing point in time.

* * * * *